(12) United States Patent
Li

(10) Patent No.: US 12,481,375 B2
(45) Date of Patent: Nov. 25, 2025

(54) ELECTRONIC SYSTEM CONTROL METHOD WHICH CAN AUTOMATICALLY SET PERIPHERAL OPERATION MODE

(71) Applicant: PixArt Imaging Inc., Hsin-Chu (TW)

(72) Inventor: Jr-Yi Li, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 3 days.

(21) Appl. No.: 18/421,945

(22) Filed: Jan. 24, 2024

(65) Prior Publication Data
US 2025/0238089 A1    Jul. 24, 2025

(51) Int. Cl.
*G06F 3/0354*    (2013.01)

(52) U.S. Cl.
CPC .................. *G06F 3/0354* (2013.01)

(58) Field of Classification Search
CPC .... G06V 20/40; G06V 10/778; G06V 10/764; G06V 40/20; G06V 40/174; G10L 15/22; G10L 25/57; G10L 15/1815; G10L 25/63; H04N 21/44; H04N 21/84; H04N 21/234; H04N 21/44218; G06N 3/08; G06F 3/011; G06F 3/017; G06F 3/041; G06F 3/013
See application file for complete search history.

(56) References Cited

U.S. PATENT DOCUMENTS

| | | | |
|---|---|---|---|
| 2005/0185364 A1* | 8/2005 | Bell | G06F 1/1632 361/679.41 |
| 2014/0327630 A1* | 11/2014 | Burr | G09G 5/006 345/173 |
| 2014/0375608 A1* | 12/2014 | Yumoto | G06F 3/0488 345/174 |
| 2017/0153813 A1* | 6/2017 | Hao | G06F 3/04886 |

* cited by examiner

*Primary Examiner* — Shaheda A Abdin
(74) *Attorney, Agent, or Firm* — Winston Hsu

(57) ABSTRACT

An electronic system control method, applied to an electronic system comprising a host device and a peripheral device, comprising: generating portrait location information and land scape location information, by the peripheral device; judging a host operation mode of the host device; and selectively using the portrait location information or the land scape location information to compute a location of the peripheral device or of an object on the peripheral device, corresponding to the host operation mode. By this way, the peripheral operation mode may be automatically set corresponding to the host operation mode. In one example, the peripheral device have at least one control button which has different functions in different modes.

8 Claims, 8 Drawing Sheets

Normal Mode

Deck Mode

ELECTRONIC SYSTEM CONTROL METHOD WHICH CAN AUTOMATICALLY SET PERIPHERAL OPERATION MODE

BACKGROUND OF THE INVENTION

1. Field of the Invention

The present invention relates to an electronic system control method, and particularly relates to an electronic system control method which can automatically set a peripheral operation mode of at least one peripheral device.

2. Description of the Prior Art

Conventional, a host device such as a computer may be connected with a plurality of peripheral devices. The peripheral devices may be used for receiving a user's input commands to control operations of the host device. The peripheral devices may need different settings corresponding to different states of the host device. However, the user needs to manually set the settings of the peripheral devices to fit the states of the host device. Such situation may cause inconvenience to the user.

SUMMARY OF THE INVENTION

One objective of the present invention is to provide an electronic system control method which can automatically set a peripheral operation mode of the peripheral device corresponding to the host operation mode.

One embodiment of the present invention discloses an electronic system control method, applied to an electronic system comprising a host device and a peripheral device, comprising: generating portrait location information and land scape location information, by the peripheral device; judging a host operation mode of the host device; and selectively using the portrait location information or the land scape location information to compute a location of the peripheral device or of an object on the peripheral device, corresponding to the host operation mode.

Another embodiment of the present invention discloses an electronic system control method, applied to an electronic system comprising a host device and a peripheral device with a plurality of control buttons, comprising: judging a host operation mode of the host device; and automatically setting a peripheral operation mode of the peripheral device corresponding to the host operation mode, by the host device. The peripheral operation mode comprises a peripheral normal mode and a deck mode. At least one of the control buttons is a combination button. The combination button has a first function or has no function in the peripheral normal mode, and has a second function in the deck mode.

In view of above-mentioned embodiments, the peripheral operation mode may be automatically set corresponding to the host operation mode, thus the user does not need to manually set the peripheral device.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
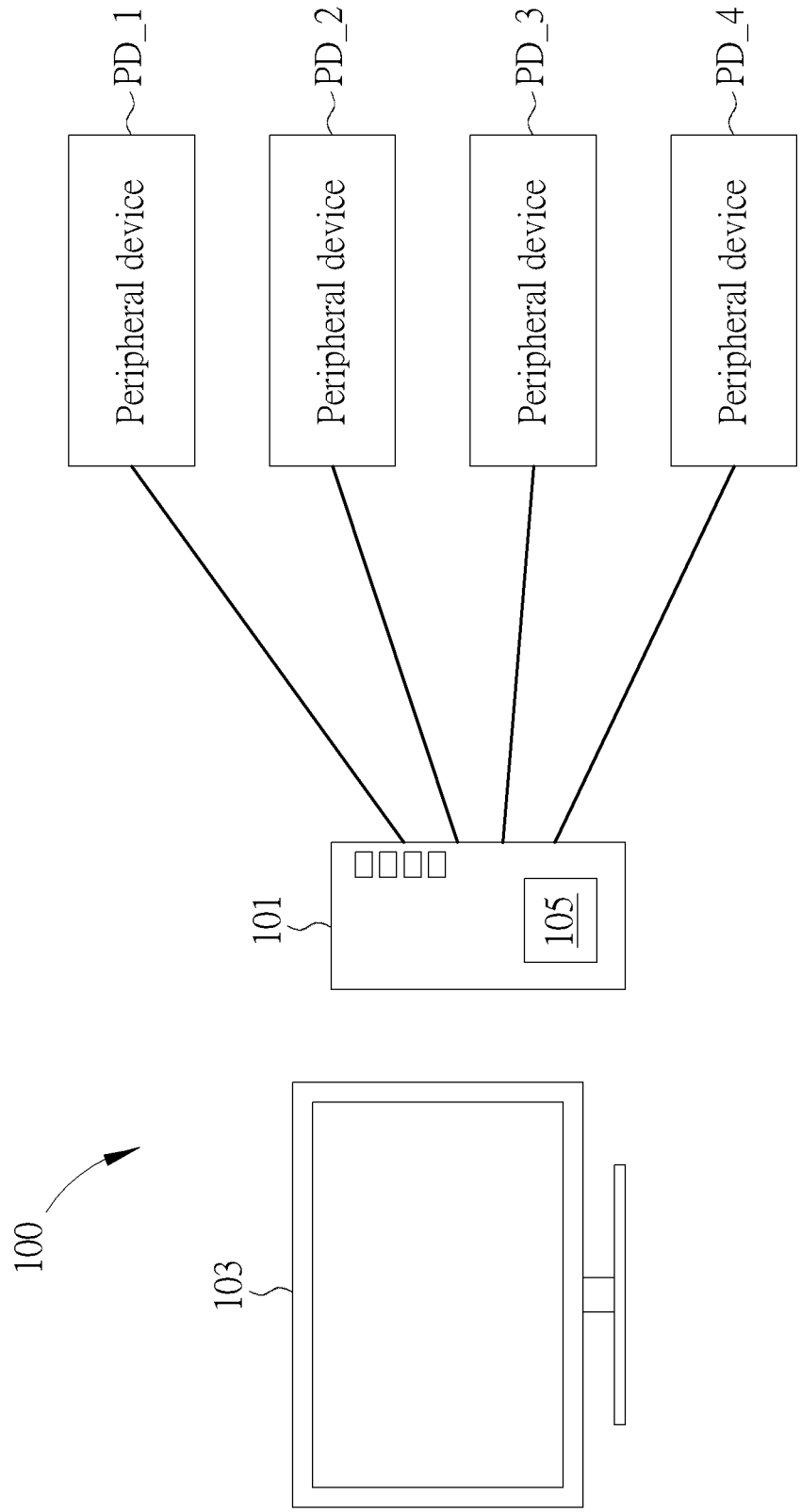
FIG. 1 is a schematic diagram illustrating an electronic system according to one embodiment of the present invention.

FIG. 1 is a schematic diagram illustrating an electronic system according to one embodiment of the present invention. As illustrated in FIG. 1, a host device 100 is connected to a plurality of peripheral devices PD_1, PD_2, PD_3 and PD_4, in a wired manner or in a wireless manner. In following embodiments, the host device 100 is a computer which comprises a computer host 101 and a screen 103. However, the host device 100 may be any other device which can control the peripheral devices PD_1, PD_2, PD_3 and PD_4.

In the embodiment of FIG. 1, the host operation mode of the host device 100 is judged by a processing circuit 105 in the computer host 101. Then, peripheral operation modes of the peripheral device PD_1, PD_2, PD_3 and PD_4 are set corresponding to the host operation mode. Details of the peripheral operation mode and the host operation mode will be described in following descriptions. Please note, in following embodiments, only one peripheral device is used for explaining. However, the steps illustrated in following embodiments may be used for more than one peripheral device.

Figure 2:
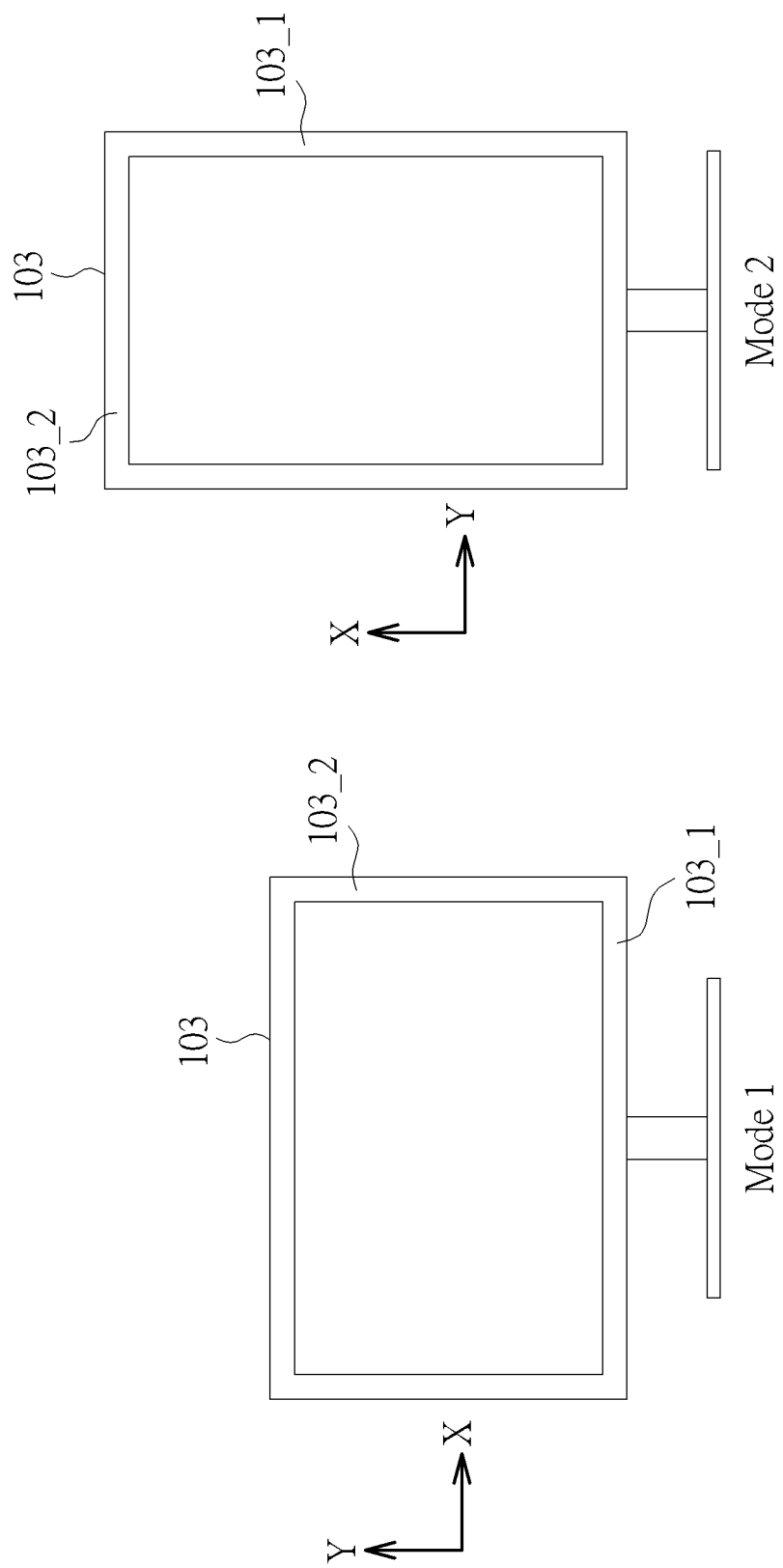
FIG. 2 and FIG. 3 are schematic diagrams illustrating examples of the host operation mode and the peripheral operation mode, according to one embodiment of the present invention.
Figure 3:
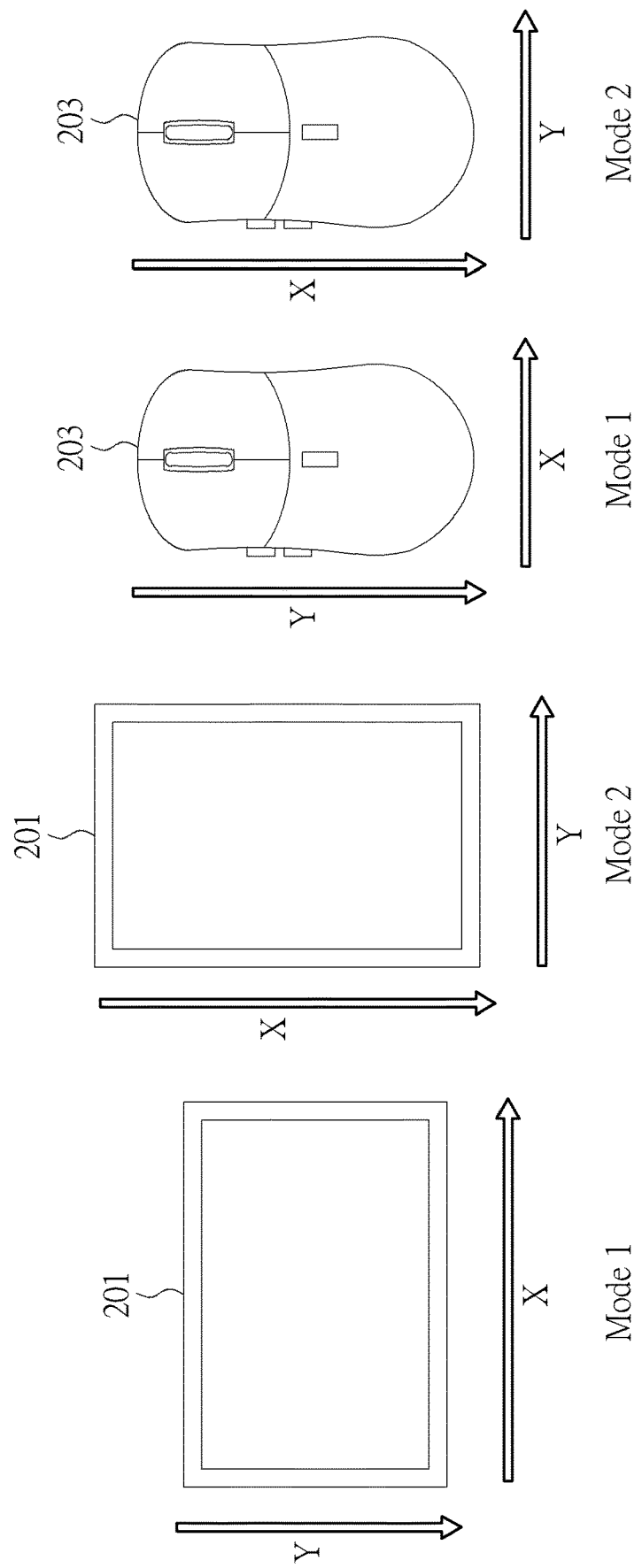

FIG. 2 and FIG. 3 are schematic diagrams illustrating examples of the host operation mode and the peripheral operation mode, according to one embodiment of the present invention. Please refer to FIG. 2 while referring to FIG. 3, to understand the concepts of the present invention for more clarity. In such embodiments, portrait location information and landscape location information are generated by the peripheral device. The host operation mode of the host device is judged by the above-mentioned processing circuit 105. Next, the processing circuit 105 selectively uses the portrait location information or the landscape location information to compute a location of the peripheral device or of an object on the peripheral device, corresponding to the host operation mode.

In the embodiments of FIG. 2, FIG. 3, the host device comprises a screen, such as the screen 103 in FIG. 1. The host operation mode is one of a screen landscape mode and a screen portrait mode. The processing circuit 105 uses the portrait location information to compute the above-mentioned location (i.e., a location of the peripheral device or of an object on the peripheral device) in the screen portrait mode and uses the landscape location information to compute the above-mentioned location in the screen landscape mode. The screen 103 comprises a long side 103 1 and a short side 103 2. In one embodiment, the screen landscape mode means the long side 103 1 is parallel with a working surface which the screen 103 is located on. On the opposite, the screen portrait mode means the short side 103 2 is parallel with the working surface.

In the embodiments of FIG. 2, FIG. 3, the screen 103 is in the screen landscape mode in the mode 1 and in the screen portrait mode in the mode 2. In such case, the peripheral device operates in a peripheral landscape mode in the mode 1 and in a peripheral portrait mode in the mode 2. Also, the touch pad 201 generates both the landscape location information and portrait location information in the mode 1. In one embodiment, the location information of the landscape location information and portrait location information comprise displacement and/or movements of an object (e.g., a finger) on the touch pad 201.

In mode 1, the X orientation is parallel with the long side 103 1 of the screen 103 and the Y orientation is parallel with the short side 103 2 of the screen 103. In such case, the X orientation is parallel with a horizontal orientation of the touch pad 201 and the Y orientation is parallel with a vertical orientation of the touch pad 201. Accordingly, in mode 1, the location information of the object on the touch pad 201 in the X orientation is shown in the X orientation of the screen 103. Also, in mode 1, the location information of the object on the touch pad 201 in the Y orientation is shown in the Y orientation of the screen 103. That is, if the object moves horizontally on the touch pad 201, a cursor corresponding to the object also moves horizontally on the screen 103. Similarly, if the object moves vertically on the touch pad 201, the cursor moves vertically on the screen 103.

In mode 2, the screen 103 is rotated for 90°, but the X orientation of the screen 103 is still parallel with the long side 103 1 and the Y orientation of the screen 103 is still parallel with the short side 103 2. Accordingly, if the processing circuit 105 still uses the landscape location information in mode 2, the movements of the object on the touch pad 201 and the movement of the cursor on the screen 103 may have different orientations. For more detail, if the landscape location information is still used in mode 2, when the object moves horizontally on the touch pad 201, the cursor moves vertically on the screen 103. Similarly, when the object moves vertically on the touch pad 201, the cursor moves horizontally on the screen 103.

Accordingly, in mode 2, the processing circuit 105 uses the portrait location information for computing the above-mentioned location. That is, in mode 2, the X orientation of the touch pad 201 is parallel with a vertical orientation thereof, and the Y orientation of the touch pad 201 is parallel with a horizontal orientation thereof. In other words, X, Y orientations of the touch pad 201 in mode 1 are swapped to form X, Y orientations of the touch pad 201 in mode 2. It will be appreciated that a physical orientation of the touch pad 201 is rotated for 90° in the embodiment of FIG. 3. However, in another embodiment, the physical orientation of the touch pad 201 is not changed and only the X orientation and the Y orientation thereof are swapped.

Please note, the above-mentioned landscape location information and portrait location information are both generated in each mode. For example, in mode 1, if the horizontal displacement and the vertical displacement of the object on the touch pad 201 is respectively d1, d2, the corresponding landscape location information for X, Y orientations is (Ld1, Ld2), and the corresponding portrait location information for X, Y orientations is (Ld2, Ld1) since X, Y orientations are swapped. In such case, the processing circuit 105 may receive both (Ld1, Ld2) and (Ld2, Ld1), and uses (Ld1, Ld2) to compute the location of the object without using (Ld2, Ld1). On the contrary, in mode 2, the processing circuit 105 may receive both (Ld1, Ld2) and (Ld2, Ld1), and uses (Ld2, Ld1) to compute the location of the object without using (Ld1, Ld2).

Following the same rule, the X, Y orientations for the mouse 203 may be changed in different peripheral operation modes (peripheral landscape mode and peripheral portrait mode), and the processing circuit 105 selectively uses the landscape location information and the portrait location information to compute the location of the mouse 203 corresponding the host operation mode, in the same manner of the touch pad 201.

For example, in mode 1, if the horizontal displacement and the vertical displacement of the mouse 203 is da, db, the corresponding landscape location information for X, Y orientations is (Lda, Ldb), and the corresponding portrait location information for X, Y orientations is (Ldb, Lda) since X, Y orientations are swapped. In such case, the processing circuit 105 may receive both (Lda, Ldb) and (Ldb, Lda), and uses (Lda, Ldb) to compute the location of the mouse 203 without using (Ldb, Lda). On the contrary, in mode 2, the processing circuit 105 may receive both (Lda, Ldb) and (Ldb, Lda), and uses (Ldb, Lda) to compute the location of the mouse 203 without using (Lda, Ldb).

In another embodiment, the peripheral operation mode comprises a peripheral normal mode and a deck mode. Also, the peripheral device comprises a plurality of control buttons, which may be physical buttons or virtual buttons. At least one of the control buttons is a combination button, wherein the combination button has a first function or has no function in the peripheral normal mode and has a second function in the deck mode.

Figure 4:
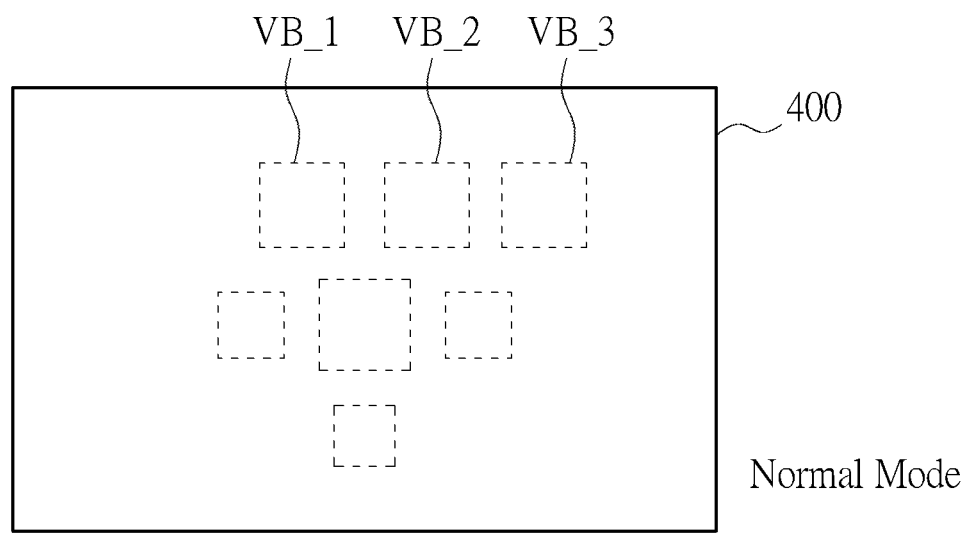
FIG. 4, FIG. 5, and FIG. 6 are schematic diagrams illustrating examples of the peripheral operation modes, according to different embodiments of the present invention.
Figure 4:
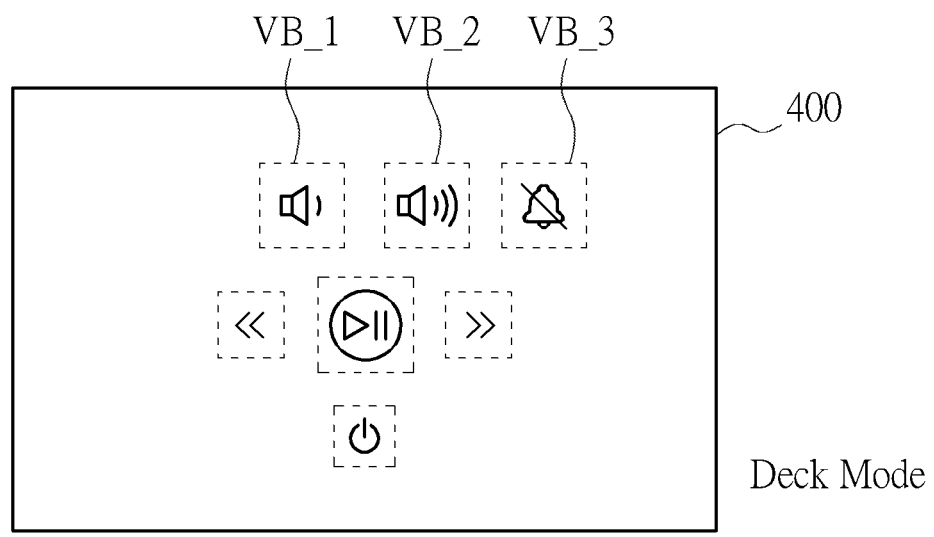

FIG. 4 is a schematic diagram illustrating an example of the peripheral operation mode, according to one embodiment of the present invention. In the embodiment of FIG. 4, the peripheral device is a touch pad 400, which can also be replaced by a deck. The touch pad 400 comprises a plurality of control buttons which are virtual buttons. Three of the control buttons are symbolized for explaining (VB 1, VB 2, VB 3). Further, in the embodiment of FIG. 4, the deck mode is a multimedia mode. For example, if the user uses an audiovisual website which can display video and/or audio or the user plays a video file, the touch pad 400 is switched from the peripheral normal mode to the deck mode.

As shown in FIG. 4, in the peripheral normal mode, the control buttons VB 1, VB 2, VB 3 have the function of sensing movements of an object (such as a finger). In other words, the control buttons VB 1, VB 2, VB 3 have no functions in the peripheral normal mode. Also, in the multimedia mode, the control buttons VB 1, VB 2 has the function of controlling volumes, and the control button VB 3 has the function of mute. In such case, the control buttons VB 1, VB 2 and VB 3 are above-mentioned combination buttons. Other virtual buttons may also respectively have the function of controlling the audiovisual website, such as fast forward, reverse, play or power off.

In the embodiment of FIG. 4, if the host device 100 operates in a host normal mode, the host device 100 sets the peripheral operation mode to operate in the peripheral normal mode. Also, if the host device 100 operates in an audiovisual displaying mode, the host device 100 sets the peripheral operation mode to operate in the multimedia mode. For example, if the user uses an audiovisual website which can display video and/or audio or the user plays a video file, the host device 100 is switched from the host normal mode to the audiovisual displaying mode.

Figure 5:
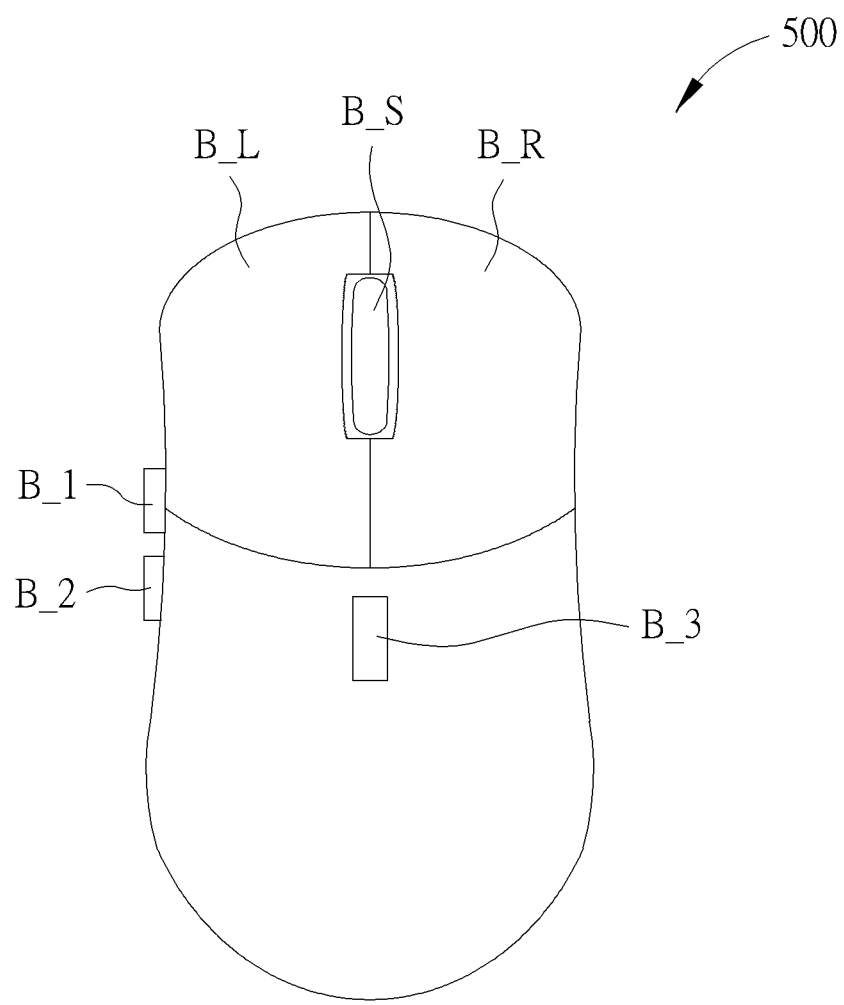

FIG. 5 is a schematic diagram illustrating an example of the peripheral operation mode, according to another embodiment of the present invention. In the embodiment of FIG. 5, the peripheral device is a mouse 500, which comprises a left button B_L, a right button B_R, a first button B_1, a second button B_2, a third button B_3 and a scroll button B_S. In the peripheral normal mode, the scrolling button B_S is used for scrolling a website or a document, the first button B_1 is used for going back to a previous website, the second button B_2 is used for going to a next website, and the third button B_3 has no function. In the multimedia mode, the scrolling button B_S is used for adjusting a volume, the first button B_1 is used for fast forwarding, the second button B_2 is used for reversing and the third button B_3 is used for playing audiovisual data or stopping the playing.

Figure 6:
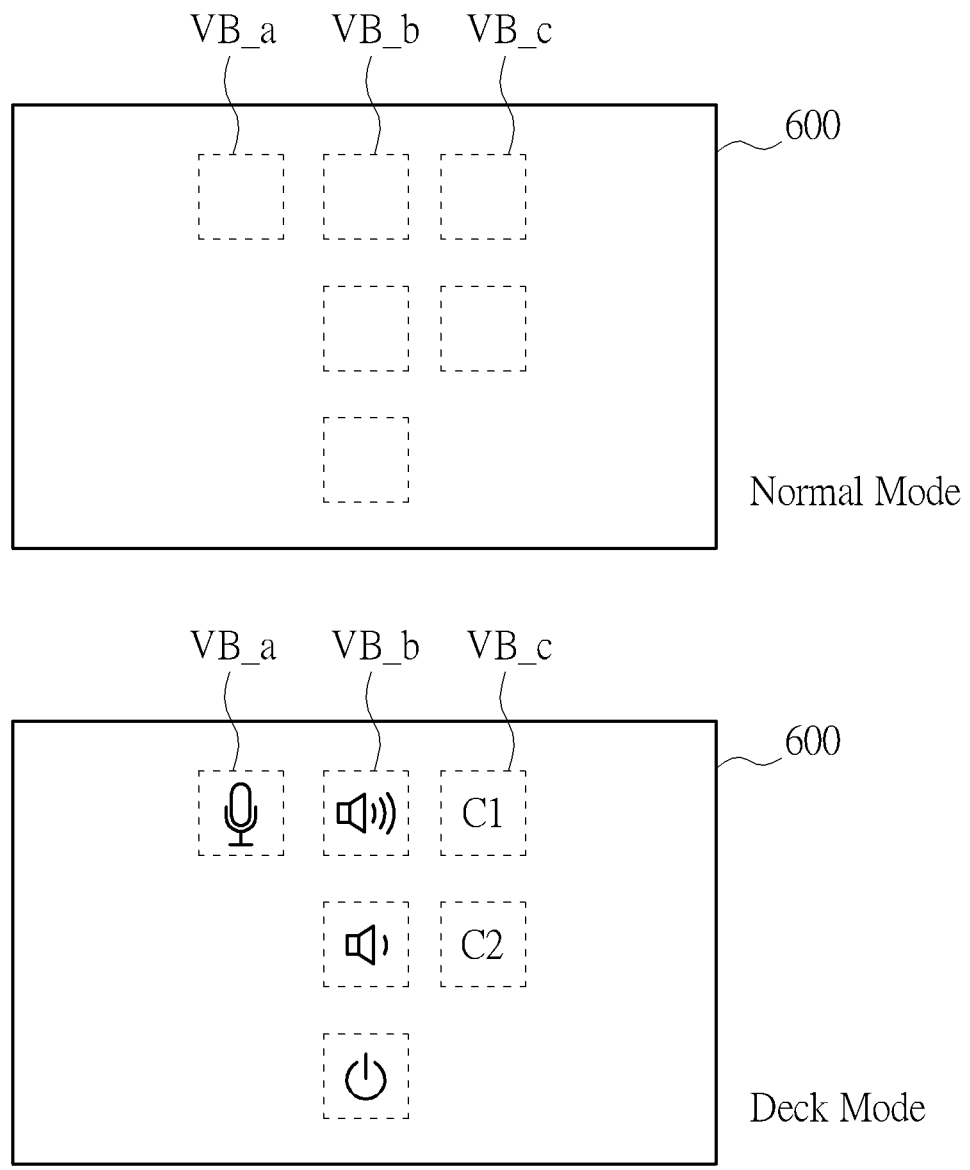

The deck mode may be other modes rather than limited to the above-mentioned multimedia mode. FIG. 6 is a schematic diagram illustrating an example of the peripheral operation mode, according to another embodiment of the present invention. In the embodiment of FIG. 6, the peripheral device is a touch pad 600, which can also be replaced by a deck. The touch pad 600 comprises a plurality of control buttons which are virtual buttons. Three of the control buttons are symbolized for explaining (VB_a, VB_b, VB_c). Further, in the embodiment of FIG. 6, the deck mode is a live streaming mode. For example, if the user starts to use a live streaming app or a live streaming website, the touch pad 600 is switched from the peripheral normal mode to the live streaming mode.

As shown in FIG. 6, in the peripheral normal mode, the control buttons VB_a, VB_b, VB_c have the function of sensing movements of an object (such as a finger). In other words, the control buttons VB_a, VB_b, VB_c no functions in the peripheral normal mode. Also, in the live streaming mode, the control buttons VB_a has the function of turning on or turning off a microphone, VB_b has the function of controlling volumes, and the control button VB_c has the function of using a first camera C1. Other virtual buttons may also respectively have the function of controlling the live streaming, such as controlling volumes, mute, or using a second camera C2.

In the embodiment of FIG. 6, if the host device 100 operates in a host normal mode, the host device 100 sets the peripheral operation mode to operate in the peripheral normal mode. Also, if the host device 100 operates in an audiovisual displaying mode, the host device 100 sets the peripheral operation mode to operate in the live streaming mode. For example, if the user starts to use a live streaming app or a live streaming website, the host device 100 is switched from the host normal mode to the audiovisual displaying mode. In such case, the audiovisual displaying mode may be regarded as a host live streaming mode.

In one embodiment, the functions of the same control button in FIG. 6 may have different functions for different recorded live streaming apps or different recorded live streaming websites. For example, the control button VB_a is for controlling a volume while using a live streaming app A, but is for switching to a next song while using a live streaming app B, and is for turning on and turning off a microphone while using a live streaming website X.

The concepts disclosed in the embodiment of FIG. 6 can be applied to the mouse 500 in FIG. 5. Please refer to FIG. 5 again, as above-mentioned, in the peripheral normal mode, the scrolling button B_S is used for scrolling a website or a document, the first button B_1 is used for going back to a previous website, the second button B_2 is used for going to a next website, and the third button B_3 has no function. In one embodiment, in the live streaming mode, the scrolling button B_S is used for adjusting a volume, the first button B_1 is used for using a camera C1, the second button B_2 is used for using a camera C2 and the third button B_3 is used for turning on or turning off a microphone.

In one embodiment, the host operation mode and the peripheral operation mode correspond to an application which the host device 100 uses. For example, the host device 100 executes a game program and the deck mode of the peripheral device operates in a gaming mode. In such case, the control buttons of the mouse may have the function of shortcut keys of controlling actions of game characters. For example, the first button B_1 of the mouse 500 in FIG. 5 may be used for activating an item list which shows the items of the game character in the gaming mode. In one embodiment, functions of the control buttons in above-mentioned embodiments may be set by the user rather than being fixed.

The above-mentioned operations may be implemented by various methods. In one embodiment, the host device 100 continuous detecting if any event corresponding to the host operation mode occurs, and informs the peripheral device PD_1, PD_2, PD_3 and PD_4 to set the peripheral operation mode corresponding to the event. For example, if an event which means the user is browsing an audiovisual website is detected by the host device 100, the host device 100 sets the peripheral device to operate in the multimedia mode.

Besides, in another embodiment, the host device 100 waits for an event notification, and informs the peripheral device to set the peripheral operation mode corresponding to the event notification. For example, if the host device 100 receives an event notification which means the user is browsing an audiovisual website, the host device 100 sets the peripheral device to operate in the multimedia mode. The steps of continuous detecting the event and waiting for the event notification may be implemented by writing at least one program to the host device 100.

Figure 7:
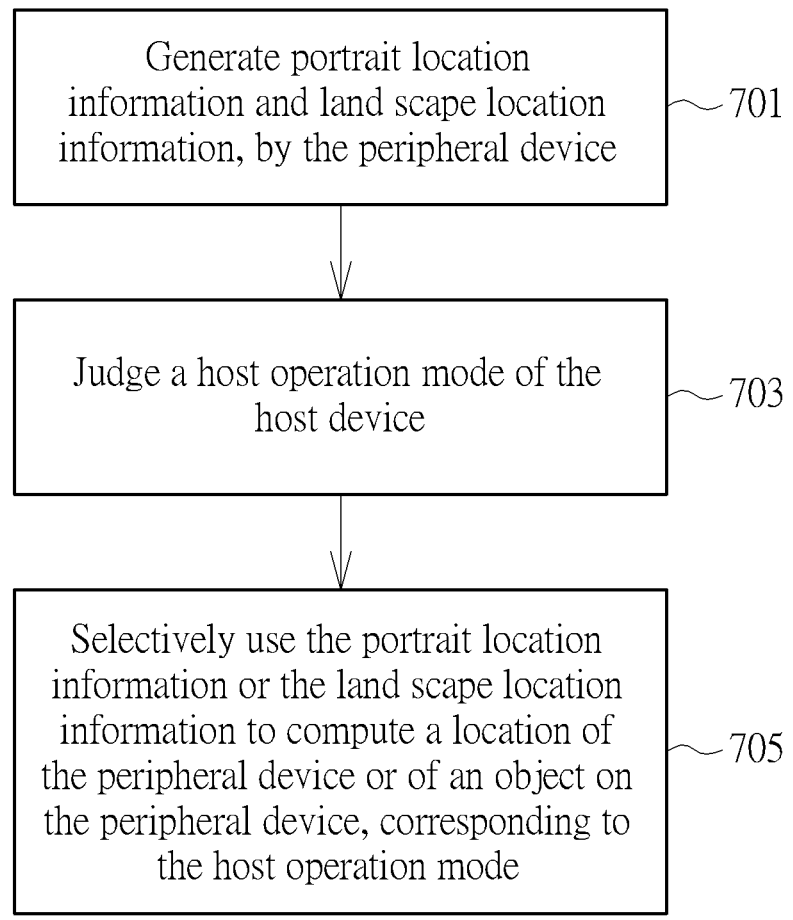
FIG. 7 and FIG. 8 are flow charts illustrating electronic system control method according to different embodiments of the present invention.
Figure 8:
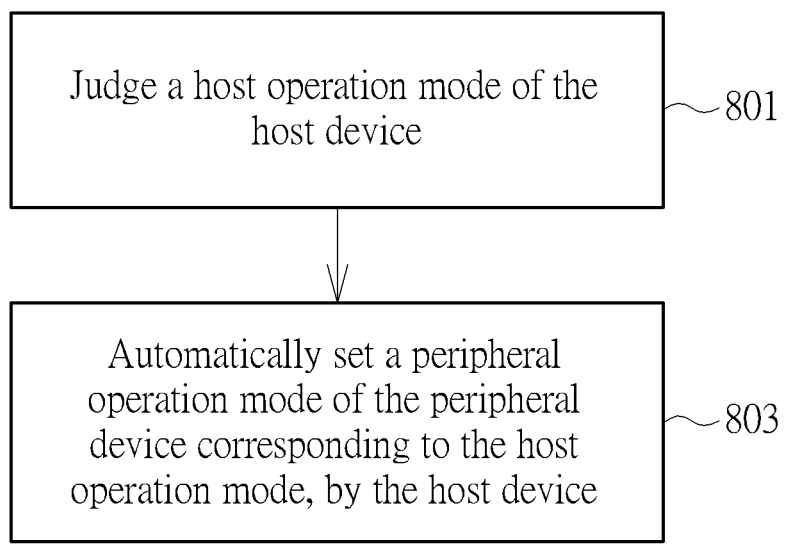

FIG. 7 and FIG. 8 are flow charts illustrating electronic system control method according to different embodiments of the present invention. The flow chart in FIG. 7 corresponds to the embodiments of FIG. 2 and FIG. 3, which comprises:

Step 701

Generate portrait location information and land scape location information, by the peripheral device (e.g., the peripheral device PD_1 in FIG. 1).

In one embodiment, two pieces of location data are generated for the same location information, and the values of the two pieces of location data are swapped. For example, as stated in the embodiments of FIG. 2 and FIG. 3, in one example of mode 1, if the horizontal displacement and the vertical displacement of the object on the touch pad 201 is respectively d1, d2, the corresponding landscape location information for X, Y orientations is (Ld1, Ld2), and the corresponding portrait location information for X, Y orientations is (Ld2, Ld1). The (Ld1, Ld2), (Ld2, Ld1) here are the above two pieces of location data. In such case, the processing circuit 105 may receive both (Ld1, Ld2) and (Ld2, Ld1), and uses (Ld1, Ld2) to compute the location of the object without using (Ld2, Ld1). On the contrary, in mode 2, the processing circuit 105 may receive both (Ld1, Ld2) and (Ld2, Ld1), and uses (Ld2, Ld1) to compute the location of the object without using (Ld1, Ld2)

Step 703

Judge a host operation mode of the host device (e.g., the host device 100 in FIG. 1).

For example, judging the host operation mode by the processing circuit 105 illustrated in FIG. 1.

Step 705

Selectively use the portrait location information or the land scape location information to compute a location of the peripheral device or of an object on the peripheral device, corresponding to the host operation mode.

The flow chart in FIG. 8 corresponds to the embodiments of FIG. 2 and FIG. 3, which comprises:

Step 801

Judge a host operation mode of the host device; and

For example, judging the host operation mode by the processing circuit 105 illustrated in FIG. 1.

Step 803

Automatically set a peripheral operation mode of the peripheral device corresponding to the host operation mode, by the host device.

For example, the processing circuit 105 illustrated in FIG. 1 automatically sets the peripheral operation mode.

The peripheral operation mode comprises a peripheral normal mode and a deck mode. The peripheral device comprises a plurality of control buttons, which may be physical or virtual buttons. At least one of the control buttons is a combination button. The combination button has a first function or has no function in the peripheral normal mode, and has a second function in the deck mode.

In view of above-mentioned embodiments, the peripheral operation mode may be automatically set corresponding to the host operation mode, thus the user does not need to manually set the peripheral device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system control method, applied to an electronic system comprising a host device and a peripheral device, comprising:
    generating portrait location information and landscape location information, by the peripheral device;
    receiving the portrait location information while receiving the landscape location information, by the host device;
    judging a host operation mode of the host device; and
    selectively using the portrait location information or the landscape location information to compute a location of the peripheral device or of an object on the peripheral device, corresponding to the host operation mode;
    wherein the portrait location information comprises portrait location information for a X orientation and portrait location information for a Y orientation;
    wherein the landscape location information comprises landscape location information for the X orientation and landscape location information for the Y orientation;
    wherein the portrait location information for the X orientation is identical with the landscape location information for the Y orientation, and the portrait location information for the Y orientation is identical with the landscape location information for the X orientation.

2. The electronic system control method of claim 1, wherein the peripheral device is a touch pad or a mouse.

3. The electronic system control method of claim 2, wherein the peripheral device operates in a peripheral landscape mode and a peripheral portrait mode corresponding to the host operation mode, wherein the host device uses the portrait location information to compute the location if the peripheral device operates in the peripheral portrait mode and uses the landscape location information to compute the location if the peripheral device operates in the peripheral landscape mode.

4. The electronic system control method of claim 3, wherein the X orientation and the Y orientation of the peripheral device in the peripheral landscape mode are swapped to form the X orientation and the Y orientation of the peripheral device in the peripheral portrait mode.

5. The electronic system control method of claim 1, wherein the host device comprises a screen, wherein the host operation mode is one of a screen landscape mode and a screen portrait mode, wherein the host device uses the portrait location information to compute the location in the screen peripheral portrait mode and uses the landscape location information to compute the location in the screen landscape mode.

6. The electronic system control method of claim 5, wherein the screen is rotated for 90° when switches from the screen landscape mode to the screen portrait mode.

7. The electronic system control method of claim 1, wherein the host device continuous detecting if any event corresponding to the host operation mode occurs, and informs the peripheral device to set the peripheral operation mode corresponding to the event.

8. The electronic system control method of claim 1, wherein the host device waits for an event notification, and informs the peripheral device to set the peripheral operation mode corresponding to the event notification.

* * * * *